(12) United States Patent
Lee et al.

(10) Patent No.: US 7,817,600 B2
(45) Date of Patent: Oct. 19, 2010

(54) METHOD AND APPARATUS FOR PERFORMING HANDOVER IN A DIGITAL BROADCASTING SYSTEM

(75) Inventors: Hye-Young Lee, Seoul (KR); Jae-Yeon Song, Seoul (KR); Jong-Hyo Lee, Pyeongtaek-si (KR); Kook-Heui Lee, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 854 days.

(21) Appl. No.: 11/526,128

(22) Filed: Sep. 22, 2006

(65) Prior Publication Data
US 2008/0225799 A1 Sep. 18, 2008

(30) Foreign Application Priority Data
Sep. 23, 2005 (KR) ............... 10-2005-0088642

(51) Int. Cl.
*H04W 4/00* (2009.01)
(52) U.S. Cl. .............. 370/331; 370/328; 370/332; 455/439; 455/440
(58) Field of Classification Search ......... 370/328–335; 455/436–444, 432.1, 525
See application file for complete search history.

(56) References Cited

U.S. PATENT DOCUMENTS

| 7,039,430 | B2 * | 5/2006 | Kang et al. | 455/458 |
| 7,065,362 | B2 * | 6/2006 | Lee et al. | 455/442 |
| 7,146,133 | B2 * | 12/2006 | Bahl et al. | 455/63.1 |
| 7,478,069 | B1 * | 1/2009 | Ritter et al. | 705/52 |
| 2004/0053630 | A1 * | 3/2004 | Ramos et al. | 455/500 |
| 2005/0170842 | A1 | 8/2005 | Chen | |
| 2005/0181794 | A1 * | 8/2005 | Rajkotia | 455/436 |

FOREIGN PATENT DOCUMENTS

| CN | 1235436 | 11/1999 |
| JP | 2004-533779 | 11/2004 |
| JP | 2005-130505 | 5/2005 |
| KR | 2000-32309 | 6/2000 |
| KR | 1020030059547 | 7/2003 |
| KR | 2003-84516 | 11/2003 |
| KR | 1020030096090 | 12/2003 |
| WO | WO 02/099983 | 12/2002 |
| WO | WO 2004/079949 | 9/2004 |
| WO | WO 2005034396 | 4/2005 |

* cited by examiner

*Primary Examiner*—Kamran Afshar
(74) *Attorney, Agent, or Firm*—The Farrell Law Firm, LLP

(57) ABSTRACT

A method is provided for performing handover by a terminal in a digital broadcasting system. The method includes measuring strength of a received signal from a serving broadcast transmitter while receiving a broadcast service, and comparing the measured strength of the received signal with a predetermined reference value; periodically measuring strength of the received signal while continuously receiving the broadcast service when the measured strength of the received signal is greater than the reference value; sending a handover start request message for the broadcasting system to a base station of a mobile communication system when the measured strength of the received signal is less than or equal to the reference value; and performing handover from the serving broadcast transmitter to a target broadcast transmitter upon receipt of an accept message for the handover start request for the broadcasting system from the base station.

22 Claims, 11 Drawing Sheets

METHOD AND APPARATUS FOR PERFORMING HANDOVER IN A DIGITAL BROADCASTING SYSTEM

PRIORITY

This application claims the benefit under 35 U.S.C. §119 (a) of an application filed in the Korean Intellectual Property Office on Sep. 23, 2005 and assigned Ser. No. 2005-88642, the entire contents of which are incorporated herein by reference.

BACKGROUND OF THE INVENTION

1. Field of the Invention

The present invention relates generally to a digital broadcasting system, and in particular, to a method and apparatus for performing a handover in a digital broadcasting system.

2. Description of the Related Art

A Digital Audio Broadcasting (DAB) system is a digital broadcasting system for audio and data services, which has been approached in European, aiming at digitalization of the existing AM and FM broadcastings. A frame structure of the DAB system will be described hereinbelow.

FIG. 1 shows a frame structure of a general DAB system. A DAB frame 101 is composed of a synchronization channel 102, a Fast Information Channel (FIC) 103, and a Main Service Channel (MSC) 104. The DAB frame 101 is composed of 1 Null symbol and 76 symbols. A first Orthogonal Frequency Division Multiplexing (OFDM) symbol is a Null symbol and a second OFDM symbol is a Phase Reference Symbol (PRS) symbol. Because there is no transmission signal in the first Null symbol, energy for a Null symbol interval is considerably lower than that of other symbol transmission intervals. Therefore, a receiver can find a frame start time by detecting the Null symbol interval using an energy detection process. The second symbol, a PRS symbol, transmits phase information for data demodulation. These two symbols constitute the synchronization channel 102, and the synchronization channel 102 corresponds to the two leading symbol intervals in the DAB frame. The synchronization channel 102 is followed by an interval of the FIC 103, and 3 symbols are used for transmitting the FIC. The remaining 72 symbols are used for transmitting the MSC 104.

The FIC 103 is composed of Fast Information Blocks (FIBs) 105, and the number of FIBs 105 transmitted through one FIC 103 differs according to transmission mode. A total of 4 transmission modes are possible: the number of FIBs is 12 for Transmission Mode 1, 3 for Transmission Mode 2, 4 for Transmission Mode 3, and 6 for Transmission Mode 4. The FIB 105 has a length of a total of 256 bits, and is composed of 240-bit FIB data 106 and 16-bit Cyclic Redundancy Check (CRC) 107. The FIB data 106 is composed of several Fast Information Groups (FIGs) 108. The FIG. 108 is divided into a FIG header 109 and a FIG data interval 110. The FIG header 109 is composed of a FIG Type 111 indicating a type of the data transmitted in the FIG data interval 110, and a FIG Length 112 indicating a length of the FIG data interval 110. The FIG. 108 is transmitted through the FIB data 106, and when the total length of the transmission FIG 108 is not equal to a length of the FIB data 106, an End Indicator 113 is used to indicate an end of the valid data interval and the remaining interval is padded with '0'. The End Indicator 113 is composed of 8 bits, all of which are '1'.

The MSC 104, an interval where transmission data is situated, is composed of Common Interleaved Frames (CIFs) 114, and the number of CIFs 114 differs according to transmission mode. The number of CIFs transmitted over one MSC is 4 for Transmission Mode 1, 1 for Transmission Modes 2 and 3, and 2 for Transmission Mode 4. The CIF 114 has a 55296-bit length, and is composed of subchannels 115. When the 55296-bit CIF cannot be fully filled with the transmission subchannels, the remaining interval is padded with '0'.

Information transmitted over the FIC includes an FIC data service signal used for transmitting traffic information or emergency messages, Multiplex Configuration Information (MCI), Service Information (SI), etc.

The MCI transmits position and length information for each of the subchannels constituting the MSC, and information on a channel coding rate of each subchannel. In addition, the MCI transmits a list of services transmitted through one ensemble. Further, in an occasion where several services are transmitted through one ensemble, the MCI transmits the connection relationship information indicating to which service components each of the services is connected. Moreover, in an occasion where each of the services is connected to one or several service components, the MCI transmits the connection relationship information indicating through which subchannel each of the service components is transmitted. Besides, when the multiplexed information is reconfigured, the MCI transmits the reconfigured information.

The SI indicates information on each service, which is not included in the MCI. The SI includes information related to the services included in the currently transmitted ensemble, such as service component information, time and country information, program information, etc. In addition, the SI includes information on other ensembles and services, such as Frequency Information (FI), Transmitter Identification Information (TII), Other Ensemble (OE) information, Service Linking information, Region Definition information, Local Service Area information, etc.

The FIC data service signal refers to a signal of the service that transmits data rather than the control information through the FIC, and types of the FIC data services are classified into Paging, Traffic Message Channel (TMC), Emergency Warning Systems (EWS), etc. A channel where the data service is transmitted through the FIC is called a Fast Information Data Channel (FIDC).

The MCI, SI and FIDC are transmitted through a data part of the FIG, and a header of the FIG is set to a different value according to the data transmitted in the FIG data part. Therefore, the receiver can determine a type of the data transmitted through the header in the FIG data part. The FIG is variable in length according to the amount of transmission data, and the information on a length of each FIG can also be determined through the FIG header. The FIGs of several types are multiplexed, forming one FIC.

The MCI and SI are the information that the receiver should know to receive a DAB signal, demodulate the received DAB signal and provide the demodulated signal to the user. The receiver can demodulate the data transmitted through the MSC for each individual service using the MCI and SI, and then provide the service selected by the user.

The user uses the DAB service either in a fixed position or in a moving environment. When the user uses the DAB service in a fixed position, a terminal of the user is located in a constant distance from a DAB transmitter that transmits the DAB service signal, so a variation in received signal strength with the passage of time is not significant. However, when the user uses the DAB service while on the move, a distance between the user's terminal and the DAB transmitter undergoes a change. Therefore, the signal that the terminal receives from the DAB transmitter changes in its received quality with the passage of time.

The DAB transmitter transmits the above-described DAB frame, and the DAB frame transmitted by the DAB transmitter is called one ensemble. The ensemble, a signal of the DAB transmitter, is limited in the area where the signal can reach, according to transmission power of the transmitter. The area where the signal of the transmitter can reach is called a service area of the transmitter. In addition, the area where the receiver can receive the arrived ensemble is called an ensemble service area. In the case where the ensemble of the transmitter is transmitted from one transmitter, the ensemble service area is identical to the service area of the transmitter. However, the ensemble may differ for every DAB transmitter, or several DAB transmitters may transmit the same ensembles. Therefore, when several DAB transmitters transmit the same ensembles, the ensemble service area is not identical to the transmitter service area.

FIG. 2 shows an ensemble service area where there are four different DAB transmitters. Of the four transmitters, a DAB transmitter #1 201 transmits an ensemble A, a DAB transmitter #2 202 transmits an ensemble B, a DAB transmitter #3 203 transmits the ensemble A, and a DAB transmitter #4 204 transmits the ensemble A. Each of the DAB transmitters has its own transmitter service area. Each of the transmitter service areas refers to the area where a signal of the corresponding transmitter can reach, and as shown in FIG. 2, the transmitter service area is formed circularly centering on the corresponding transmitter.

Of the DAB transmitters, the transmitter #1 201, the transmitter #3 203 and the transmitter #4 204 transmit the same ensemble A. That is, although the 3 DAB transmitters have different service areas, the receiver can receive the same ensemble A in all of the service areas of the three DAB transmitters. Therefore, the ensemble service area where the receiver can receive the ensemble A is an area 205 including all of the service areas of the DAB transmitter #1 201, the DAB transmitter #3 203, and the DAB transmitter #4 204.

When a terminal 206 currently receiving the ensemble A in the service area of the DAB transmitter #1 201 moves to the service area of the DAB transmitter #3 203, the terminal 206 can continuously receive the ensemble A even though the DAB transmitter transmitting the ensemble A has changed from the DAB transmitter #1 201 to the DAB transmitter #3 203. The terminal 206 belongs to the service area of the DAB transmitter #1 201 when it is located in a position A, but the terminal 206 belongs to the service area of the DAB transmitter #3 203 when it moves to a position B. However, because the signals of the two transmitters are the same ensembles, the terminal 206 has no problem in receiving the ensemble A and providing the same service to the user.

However, if a terminal 207 currently receiving the ensemble A in the service area of the DAB transmitter #1 201 moves to the service area of the DAB transmitter #2 202, the terminal 207 can no longer receive the ensemble A for the following reason. When the terminal 207 is located in a position C, it is located in the service area of the DAB transmitter #1 201. However, when the terminal 207 moves to a position D, it is located in the service area of the DAB transmitter #2 202, which transmits the ensemble B rather than the ensemble A. Therefore, the terminal 207 cannot receive the ensemble A in the position D, so the existing service being provided to the user by the terminal 207 is interrupted.

As shown in FIG. 2, a variety of DAB transmitters exist in the DAB system, and in the environment where the terminal receiving the signal of the DAB transmitter moves from place to place, there is a possible situation where the terminal leaves the service area of the current DAB transmitter and moves to the service area of the different DAB transmitter. In a case where the terminal has moved between the service areas of the DAB transmitters, if the DAB transmitters transmit different ensembles, the terminal interrupts the currently received service.

However, the ensemble is composed of more than one service because several different services are multiplexed in the ensemble before being transmitted. The different services may include audio service, video service, data service, etc.

FIG. 3 shows service multiplexing in an ensemble according to the prior art. One ensemble 301 may include more than one service. The ensemble 301 will be called an ensemble A. The ensemble A has more than one service 302. The ensemble A 301 has 3 services 302 of Alpha-1 radio, Beta radio, and Alpha-2 radio. Each of the services 302 is composed of more than one service component 303. For example, Alpha-1 radio is composed of 3 service components of 'Audio-1', 'Alpha-TMC' and 'Alpha-SI'. Beta radio is composed of 2 service components of 'Audio' and '2nd-ry Audio', and Alpha-2 radio is composed of a total of 4 service components of 'Audio 1', 'Audio 3', 'Alpha-TMC' and 'Alpha-SI'. Each of the services has a primary service component: Alpha-1 radio has the service component 'Audio 1' as a primary service component, and Beta radio has the service component 'Audio 2' as a primary service component. Alpha-2 radio has the two service components 'Audio 1' and 'Audio 3' connected to a switch, one of which becomes a primary service component. That is, unlike Alpha-1 radio having only one service component as a primary service component, Alpha-2 radio changes in its primary service component with the passage of time.

Each of the service components 303 is transmitted with one subchannel 304. The subchannels 304 used for transmitting their associated service components constitute an MSC, and the positions of the MSC where the subchannels 304 are transmitted can be determined depending on the MCI as described in connection with FIG. 1.

As shown in FIG. 3, various services are multiplexed in one ensemble. Therefore, when there are different ensembles of an ensemble A and an ensemble B, the same service may exist in the two different ensembles. If there is any same service in the different ensembles, there is a possibility that the terminal can continue the same service even though it receives the different ensembles.

The terminal can perform a handover process so that it continues the same service even though it receives different ensembles, and the terminal makes a spontaneous decision for handover based on strength of a received signal. However, the strength of the received signal may decrease, not only because the terminal is located at the boundary of the broadcast network, but also because even though the terminal is located in the vicinity of the broadcast transmitter, it cannot receive signals due to obstacles or as it enters a shadowing area. Therefore, if the terminal determines whether to start the handover process simply depending on only the strength of the received signal, it may encounter a handover error.

SUMMARY OF THE INVENTION

To substantially solve at least the above problems and/or disadvantages and to provide at least the advantages below, it is an object of the present invention to provide a method and apparatus for obtaining information on an expected handover time and information on a target broadcasting system for handover from a base station of a mobile communication system in performing handover to support seamless service in a digital broadcasting system, thereby reducing a handover error and a handover process time.

It is another object of the present invention to provide a method and apparatus for allowing a base station of a mobile communication system to determine whether to start a handover process in performing a handover while a terminal receives broadcast service, so it can inform the terminal whether to start the handover process using an interaction channel.

It is further another object of the present invention to provide a method and apparatus for reducing the time for performing a handover with the use of an interaction channel between a terminal and a base station of a mobile communication system.

According to one aspect of the present invention, there is provided a method for performing handover by a terminal in a digital broadcasting system. The method includes measuring strength of a received signal from a serving broadcast transmitter while receiving a broadcast service, and comparing the measured strength of the received signal with a predetermined reference value; periodically measuring strength of the received signal while continuously receiving the broadcast service when the measured strength of the received signal is greater than the reference value; sending a handover start request message for the broadcasting system to a base station of a mobile communication system when the measured strength of the received signal is less than or equal to the reference value; and performing handover from the serving broadcast transmitter to a target broadcast transmitter upon receipt of an accept message for the handover start request for the broadcasting system from the base station.

According to another aspect of the present invention, there is provided a method for supporting handover of a terminal by a base station of a mobile communication system in a digital broadcasting system. The method includes receiving a request message for requesting a handover of the broadcasting system from the terminal that is receiving a broadcast service from a serving broadcast transmitter in its own cell coverage; detecting a position of the terminal in response to the request message, and determining whether the terminal is located in a position where it should perform handover of the broadcasting system, using a predetermined broadcast transmitters' position map; transmitting an accept message for accepting the handover request to the terminal when it is determined that the terminal is located in the position where it should perform handover of the broadcasting system; and transmitting a reject message for rejecting the handover request to the terminal when it is determined that the terminal is not located in the position where it should perform handover of the broadcasting system.

According to further another aspect of the present invention, there is provided an apparatus for performing handover by a terminal in a digital broadcasting system. The apparatus includes a signal strength measurer for receiving a broadcast service signal from a serving broadcast transmitter, and measuring strength of the received signal; and a controller configured to carry out steps including comparing the measured strength of the received signal with a predetermined reference value; transmitting a request message for requesting handover of the broadcasting system to a base station of a mobile communication system, to which the terminal belongs, when the strength of the received signal is less than the reference value; and performing a handover from the serving broadcast transmitter to a target broadcast transmitter upon receipt of an accept response for the handover request for the broadcasting system from the base station.

According to yet another aspect of the present invention, there is provided an apparatus for supporting handover of a terminal by a base station of a mobile communication system in a digital broadcasting system. The apparatus includes a transceiver for receiving a request message for requesting handover of the broadcasting system from the terminal in a cell coverage, and transmitting a response message for accepting the handover request to the terminal; a memory for storing a broadcast transmitters' position map in which positions of adjacent broadcast transmitters are listed; and a controller configured to carry out steps including detecting a position of the terminal in response to the request message, determining whether the terminal is located in a position where it should perform handover of the broadcasting system, using the predetermined broadcast transmitters' position map; transmitting an accept message for accepting the handover request to the terminal via the transceiver when it is determined that the terminal is located in the position where it should perform handover of the broadcasting system; and transmitting a reject message for rejecting the handover request to the terminal via the transceiver when it is determined that the terminal is not located in the position where it should perform handover of the broadcasting system.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF PREFERRED EMBODIMENTS

Preferred embodiments of the present invention will now be described in detail with reference to the annexed drawings. In the following description, a detailed description of known functions and configurations incorporated herein has been omitted for clarity and conciseness.

The present invention can be applied to a broadcasting system using digital transmission technology, such as Digital Audio Broadcasting (DAB), Digital Video Broadcasting (DVB), Digital Multimedia Broadcasting (DMB), etc. The present invention will be described with reference to a DAB system among the digital broadcasting systems, by way of example, and other digital broadcasting systems can also perform the same handover process as done in the DAB system. However, when the present invention is applied to the other systems, names of the elements of the corresponding systems should change accordingly, but this will not be described herein for simplicity.

A terminal used in a digital broadcasting system may be either a broadcast-only terminal capable of receiving only DAB signals, or a complex terminal capable of receiving not only DAB signals but also mobile communication signals. Such a complex terminal can simultaneously receive signals from a broadcast transmitter and signals from a base station of a mobile communication system (hereinafter referred to as a "mobile communication base station"). That is, the broadcasting system and the mobile communication system can be simultaneously implemented. When a complex terminal is considered from the viewpoint of a broadcasting system, a channel for receiving a signal from a transmitter of the broadcasting system is called a broadcasting channel, and a communication channel to a mobile communication network of the terminal is called an interaction channel. Support of the interaction channel is defined in the standard for a DAB system. While the broadcasting channel is a unidirectional channel for transmitting signals from a broadcast transmitter to a terminal, the interaction channel is a bidirectional channel capable of transmitting signals from a terminal to a mobile communication base station, and from the mobile communication base station to the terminal.

The present invention provides a method of using an interaction channel to a mobile communication base station for a handover in a digital broadcasting system.

Figure 1:
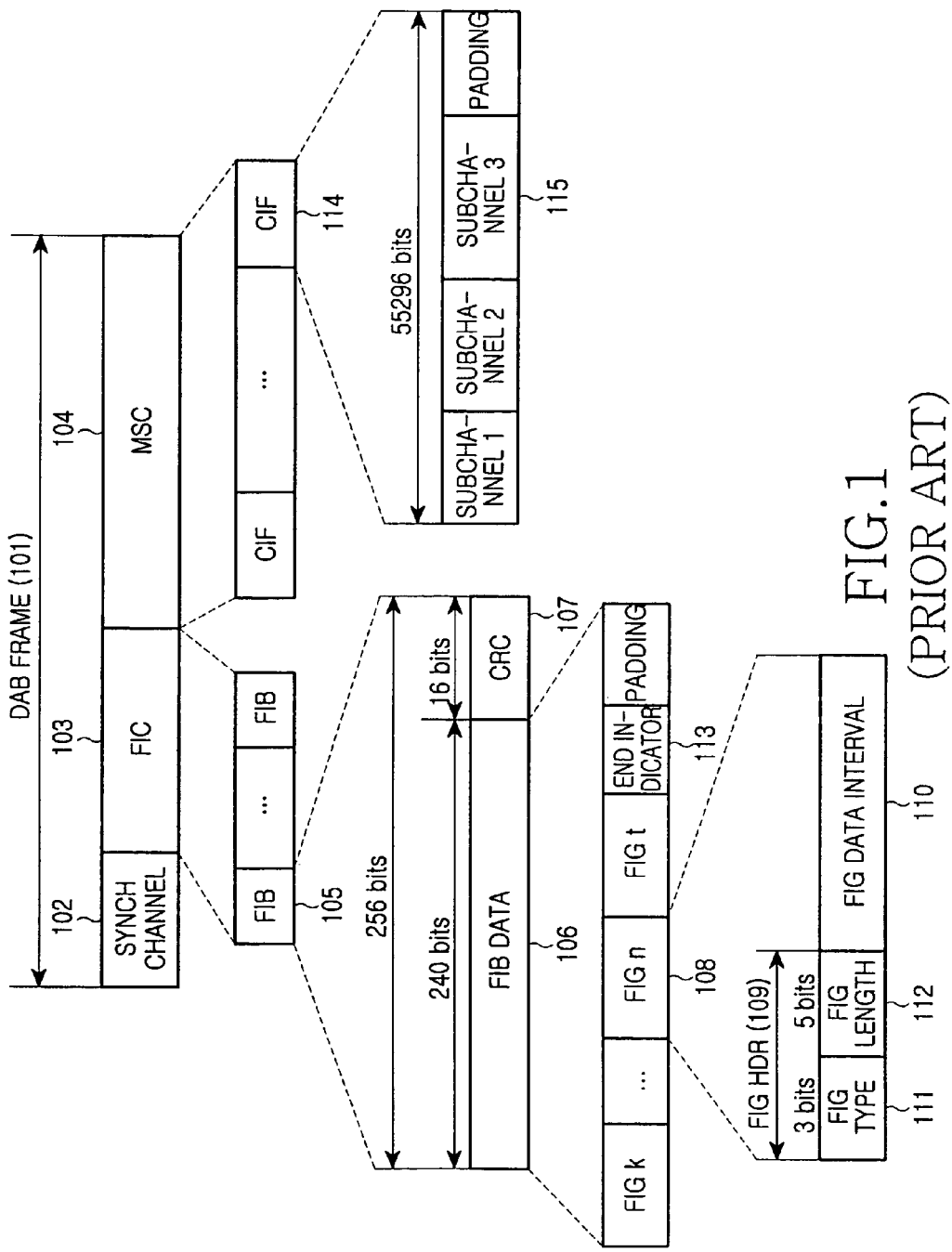
FIG. 1 is a diagram illustrating a frame structure of a general DAB system according to the prior art.
Figure 2:
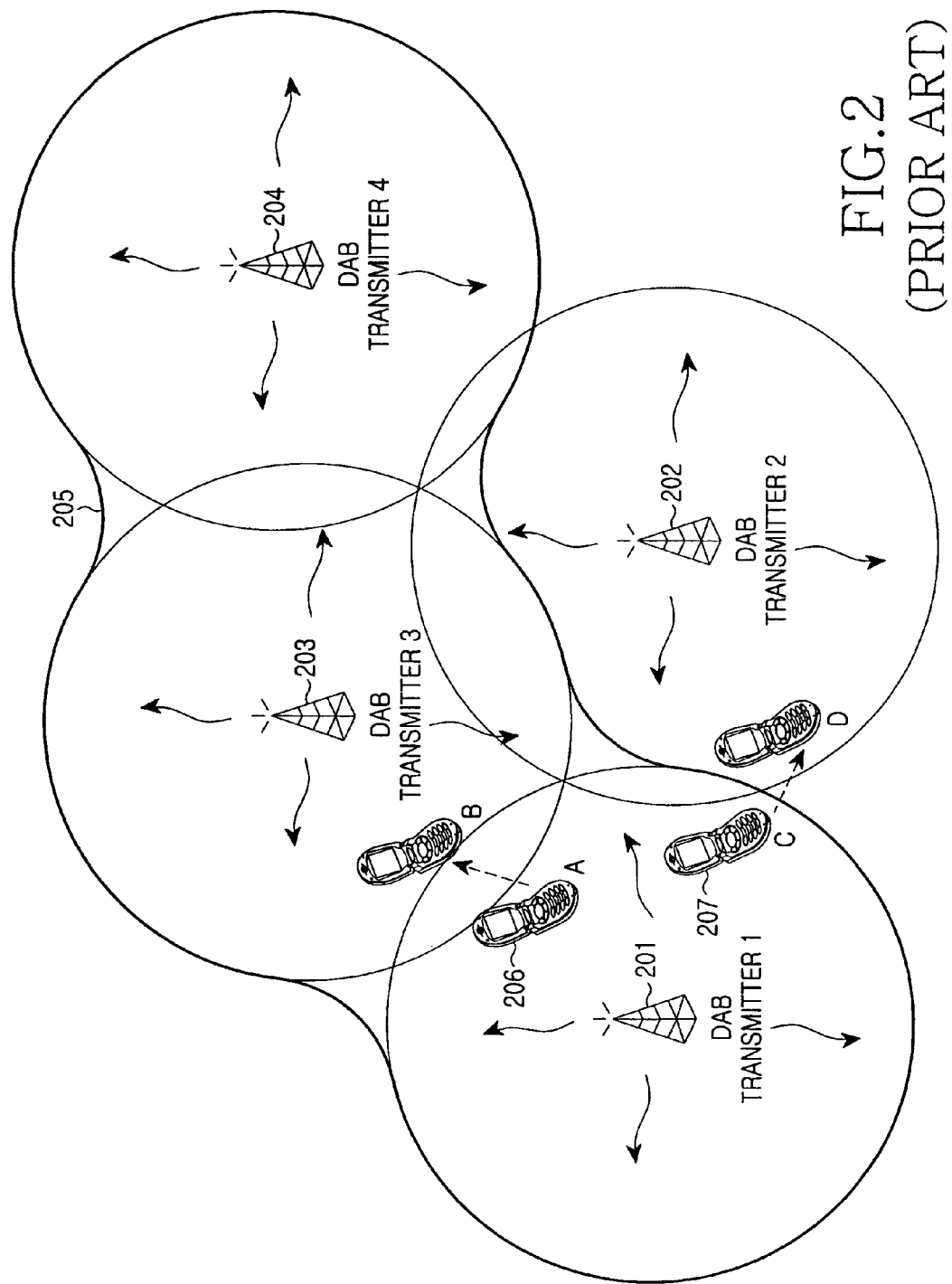
FIG. 2 is a diagram illustrating an ensemble service area according to the prior art.
Figure 3:
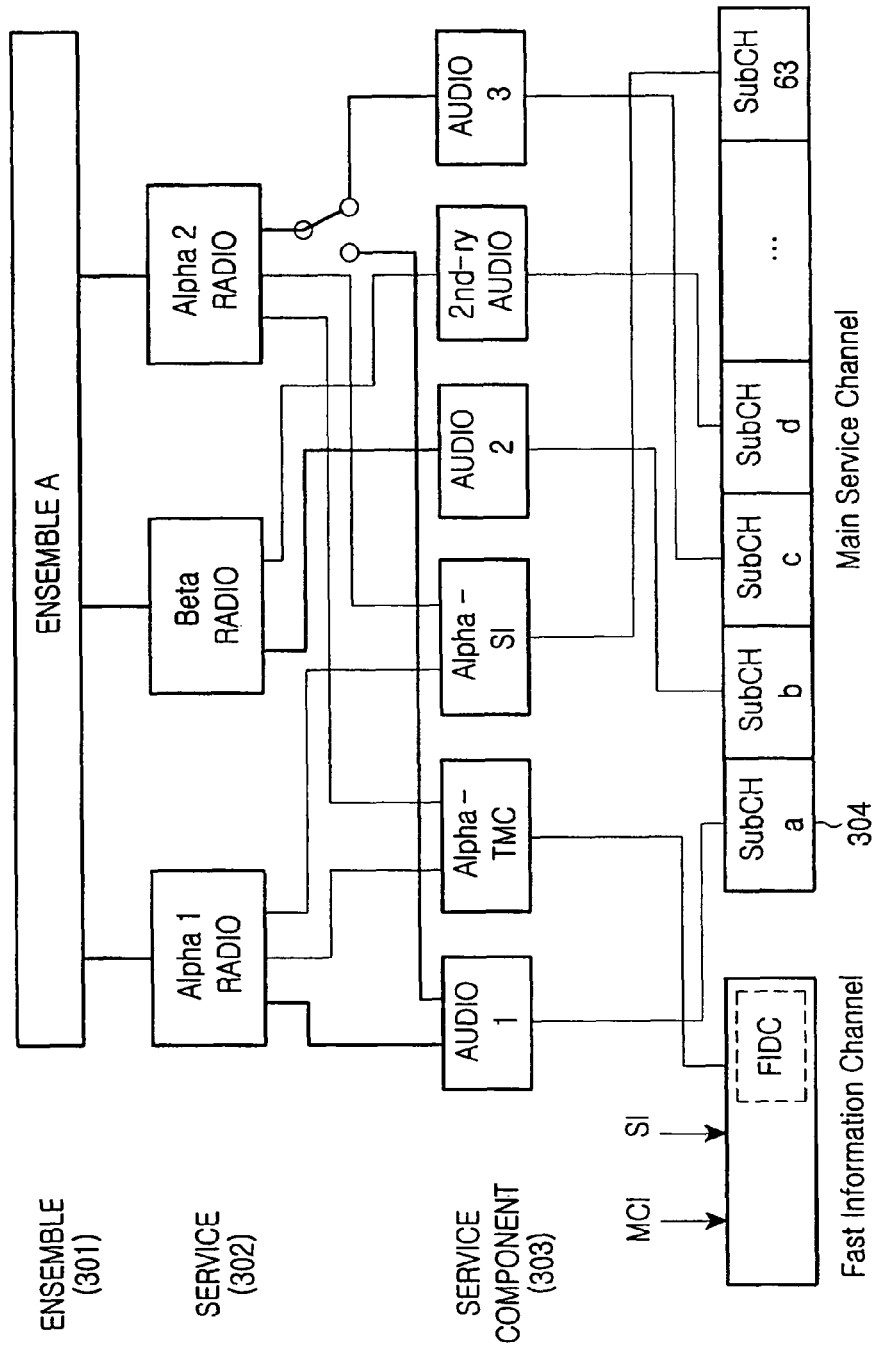
FIG. 3 is a diagram illustrating service multiplexing in an ensemble according to the prior art.
Figure 4:
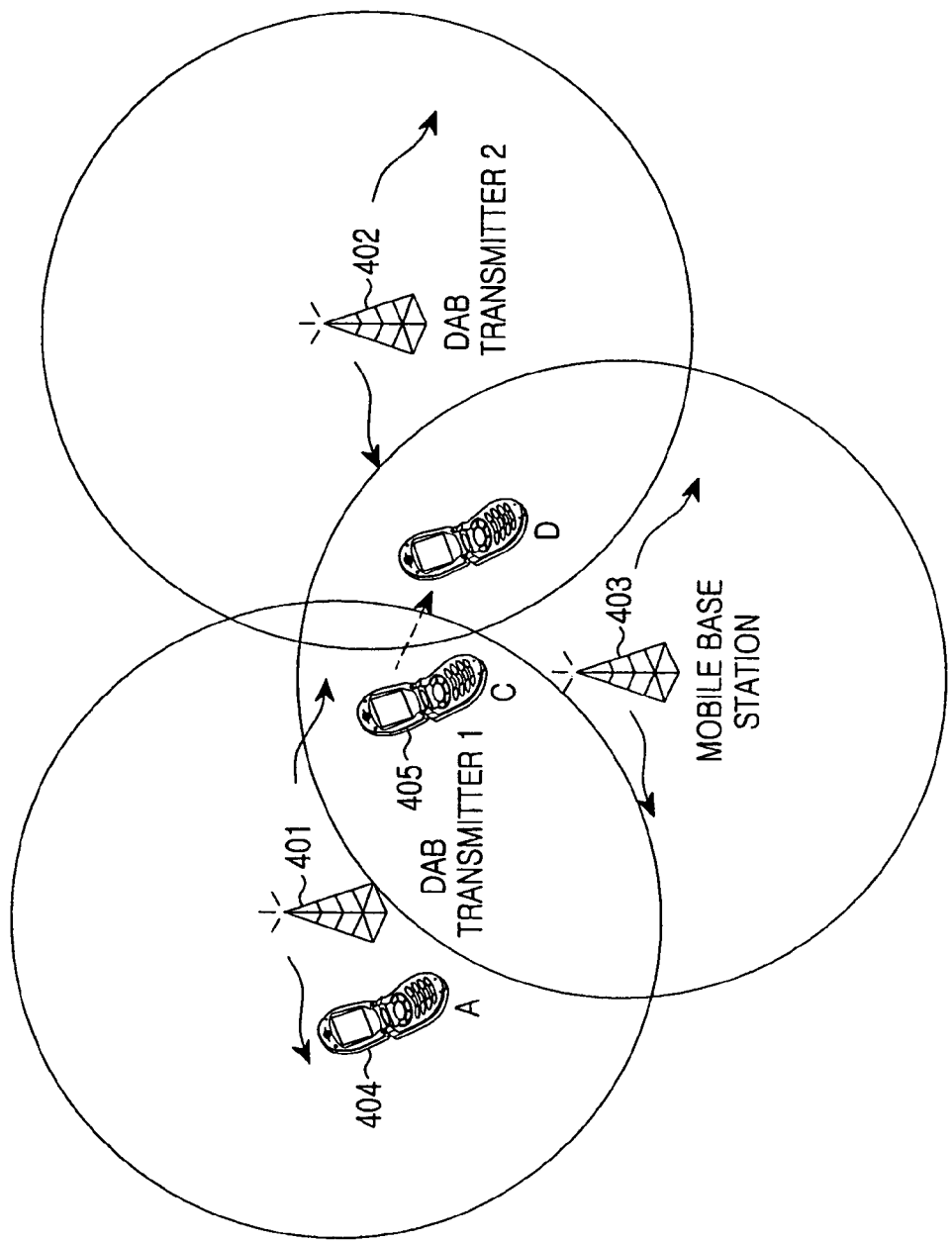
FIG. 4 is a diagram illustrating a positional relationship between a mobile communication base station and a broadcast transmitter according to the present invention.

FIG. 4 shows a positional relationship between a mobile communication base station and a broadcast transmitter according to the present invention. The broadcast transmitter refers to a digital broadcasting system, and means a DAB system herein, by way of example.

A DAB transmitter #1 401 and a DAB transmitter #2 402 are transmitters for transmitting signals for DAB service. A terminal 404 and a terminal 405 are located in a service area of the DAB transmitter #1 401. The two terminals 404 and 405, although located in the service area of the DAB transmitter #1 401, can receive signals of a mobile communication base station (or mobile base station) 403. Therefore, the terminals 404 and 405 have an interaction channel to the mobile communication base station 403.

The terminal 404 is located at the boundary of the service area of the mobile communication base station 403, and is also located at the center of the service area of the DAB transmitter #1 401. The terminal 405 is located in the service area of the mobile communication base station 403, and is also located at the boundary of the service area of the DAB transmitter #1 401. In addition, the terminal 405 is now moving from a position C to a position D.

It is assumed that while the two terminals 404 and 405 are both receiving service from the DAB transmitter #1 401, strength of the signal received from the DAB transmitter #1 401 is less than a reference value. It is assumed that although the terminal 404 is located in the center of the service area of the DAB transmitter #1 401, strength of its received signal is less than a reference value due to the surrounding interference. Further, it is assumed that as the terminal 405 is located at the boundary of the service area of the DAB transmitter #1 401, strength of its received signal is less than a reference value. In this case, unlike the terminal 405 that performs a handover process and receives a signal of the DAB transmitter #2 402 because strength of its received signal is low as it is located at the boundary of the service area of the DAB transmitter #1 401, the terminal 404 performs a handover operation simply because strength of its received signal is less than a reference value as it is unaware of its own position even though it is located in the center of the service area of the DAB transmitter #1 401. However, the terminal 404 suffers a handover error because it cannot receive signals of any other DAB transmitter in its position. The handover error, caused when the terminal 404 starts a handover process even though it is not located in a handover region, occurs because the terminal determines whether to start the handover process simply depending on only the strength of a received DAB signal.

The present invention determines whether to start the handover process depending not only on the measured strength of the received signal, but also on the information received from the mobile communication base station 403. The information received from the mobile communication base station 403 includes information indicating whether the mobile communication base station 403 will start a handover process for the terminal needing handover of the broadcasting system, and control information of the associated broadcasting system. According to the present invention, both of the terminal 404 and the terminal 405 of FIG. 4 send a handover start inquiry to the mobile communication base station 403 to which they belong before starting the handover process, instead of performing the handover process immediately when strengths of their received signals are less than a reference value.

Upon receipt of a handover request for the broadcasting system from a terminal in its own cell, the mobile communication base station 403 determines whether the terminal is located in a handover region of a broadcast transmitter. In order to determine whether the terminal is located in the handover region of the broadcast transmitter, the mobile communication base station 403 should have positional information of DAB transmitters.

The mobile communication base station 403 is aware of positions of the DAB transmitter #1 401 and the DAB transmitter #2 402, and nearness between them. In order to obtain positional information of the DAB transmitters, the mobile communication system receives information on positions of the DAB transmitters from a DAB system, and the method of exchanging the positional information can exchange the information either by wire or wirelessly. When the positional information of the DAB transmitters undergoes a change after it is transmitted from the DAB system to the mobile communication system, the changed positional information should be updated. Generally, because the positions of the transmitters are not changed with time, there is no need to periodically exchange the positional information, and the positional information needs to be updated only when it is changed. The change in the positional information occurs when a new transmitter is added to the network, or when the existing transmitter is removed from the network. The mobile communication base station 403, as it can be aware of the positions of the DAB transmitter #1 401 and the DAB transmitter #2 402, generates one position map by listing the positions of the transmitters.

The mobile communication base station 403 should have not only the position map information associated with the broadcast transmitters, but also positional information of the terminal needing handover of the broadcast transmitter. The position of the terminal can be determined by performing a location tracking service when the terminal requests handover of the broadcasting system. The location tracking service is provided to detect a position of a particular terminal in the existing mobile communication network, and there are various possible methods for the position detection. Typically, the methods include using a Global Positioning System (GPS), and using information on the time at which the terminal receives signals from other adjacent base stations. Because a possible position detection method is defined for every mobile communication system according to a standard, the location tracking service will not be considered in the present invention, and it will be assumed that the position detection is achieved based on an associated standard.

The mobile communication base station 403, because it is aware of the position of the terminal needing handover of the broadcasting system, determines whether the terminal is located in a handover region of broadcast transmitters depending on a position map of the broadcast transmitters.

Referring to FIG. 4, the mobile communication base station 403 sends a signal for rejecting a handover start request to the terminal 404, determining that the terminal 404 is not located at the boundary of the service area of the DAB transmitter #1 401. However, because the terminal 405, unlike the terminal 404, is located at the boundary of the service area of the DAB transmitter #1 401, the mobile communication base station 403 sends a signal for accepting a handover start request to the terminal 405.

Upon receipt of the accept signal, the terminal 405 performs a handover process and starts receiving an ensemble of a new transmitter. In order to demodulate the data transmitted with an MSC of the received ensemble, the terminal 405 first obtains MCI information by demodulating FIC received from a target broadcast transmitter. If the terminal 405 starts demodulating the data on the MSC after obtaining the MCI information, handover of the terminal 405 is completed.

Figure 5:
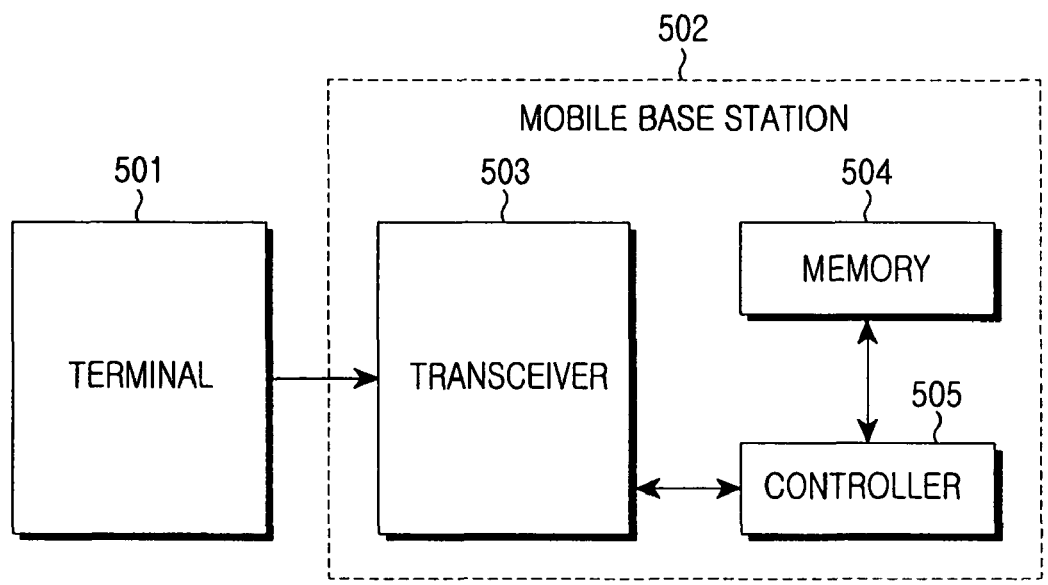
FIG. 5 is a diagram illustrating a structure of a mobile communication base station supporting handover in a broadcasting system of a terminal according to the present invention.

FIG. 5 shows a structure of a mobile communication base station supporting handover in a broadcasting system of a terminal according to the present invention. A terminal 501 and a mobile communication base station 502 have an interaction channel for interactive communication. With the use of the interaction channel, the mobile communication base station 502 receives a signal for requesting a handover start for a broadcasting system from the terminal 501, and detects a position of the terminal 501 to inform the terminal 501 whether to perform the handover. In order to detect the position of the terminal 501, the mobile communication base station 502 transmits/receives a particular signal using a transceiver 503, or uses information (for example, a GPS signal) from another external device. The detected positional information of the terminal 501 is input to a controller 505. In order to determine whether to start the handover process of the terminal 501, the mobile communication base station 502 makes reference to a broadcast transmitters' position map in a memory 504. In the mobile communication base station 502, the controller 505 sets information indicating whether to accept a handover request and information on the associated broadcast transmitters using the broadcast transmitters' position map in the memory 504 and the detected positional information of the terminal 501, and transmits the set information to the terminal 501 via the transceiver 503.

Figure 6:
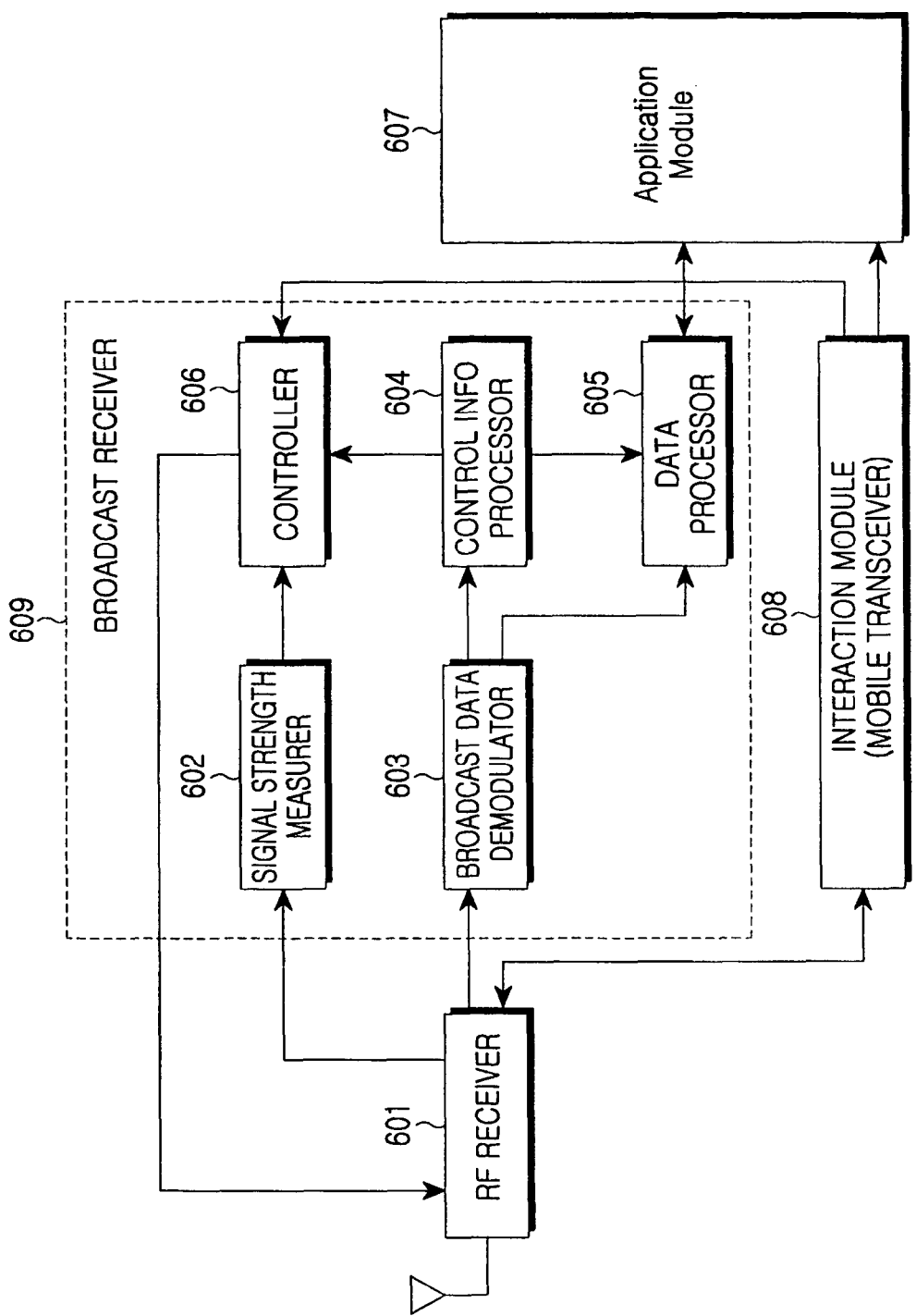
FIG. 6 is a diagram illustrating a structure of a receiver supporting a bidirectional service according to the present invention.

FIG. 6 shows a structure of a receiver supporting a bidirectional service according to the present invention. A receiver starts receiving a broadcast signal with a radio frequency (RF) receiver 601. A broadcast signal in the signal received from the RF receiver 601 is processed by a broadcast receiver 609, and the received broadcast signal is input to both a broadcast data demodulator 603 and a signal strength measurer 602.

The signal strength measurer 602 measures strength of the received signal and delivers the measured strength of the received signal to a controller 606. The controller 606 compares the strength of the received signal with a reference value for the received signal, previously set by the receiver. The reference value refers to the minimum signal strength value for demodulating data in the receiver, and can be differently selected according to performance of the receiver. Alternatively, the system prescribes the reference value and provides it to the receiver. The receiver is provided with the reference value from the system, or sets the reference value according to performance. That is, if the strength of the received signal is less than the reference value, the receiver cannot normally demodulate the received signal. Therefore, if the strength of the received signal is less than the reference value, the controller 606 prepares to perform a handover process of the broadcasting system, determining that signal strength of the current ensemble is low, and delivers a signal for inquiring whether to start the handover process, to a mobile communication transceiver (or mobile transceiver) 608.

The mobile communication transceiver 608 includes a module that performs modulation/demodulation for exchanging data with a mobile communication base station. Upon receipt of the handover start inquiry signal for the broadcasting system from the controller 606, the mobile communication transceiver 608 processes the handover start inquiry signal for the broadcasting system, and delivers the resultant signal to the RF receiver 601 using a mobile communication channel. The mobile communication channel refers to the above-described interaction channel used for exchanging mobile communication data between a mobile communication base station and a terminal.

After transmitting the handover start inquiry signal for the broadcasting system, the terminal waits for a response to the handover start inquiry for the broadcasting system through the interaction channel. Upon receipt of an accept response to the handover start inquiry for the broadcasting system through the interaction channel, the mobile communication transceiver 608 delivers the response to the controller 606. Upon receipt of the accept response to the handover start inquiry for the broadcasting system from the mobile communication transceiver 608, the controller 606 prepares to perform a handover and prepares to measure signal strength of a candidate ensemble. The candidate ensemble refers to the other ensemble including the currently received service. In order to receive the other candidate ensemble, there is a need for information on the other candidate ensemble. The information on the other candidate ensemble can be obtained from the mobile communication base station through the interaction channel, or can be obtained from the control information transmitted from the broadcast transmitter.

The broadcast data demodulator 603 demodulates input data, and the demodulated data is divided into MSC data and FIC data. The MSC data is input to a data processor 605, and the FIC data is input to a control information processor 604. The control information processor 604 demodulates MCI and SI. The demodulated MCI and SI are input to the data processor 605, and the data processor 605 decodes the received MSC data for each individual service using the control information, and delivers the resultant data to an application module 607. The application module 607 receives the decoded service data and outputs the data in a form for a screen of the terminal. The demodulated SI information is input even to the controller 606, and the controller 606 obtains information on the candidate ensemble using the SI information, which is the input control information. Upon receiving the information on the candidate ensemble, the controller 606 determines which candidate ensemble it will perform a handover, and provides the determined value to the RF receiver 601. The RF receiver 601 shifts the RF frequency according to the information provided from the controller 606. The receiver receives the new ensemble to which the handover is performed, through the shifted frequency.

Figure 7:
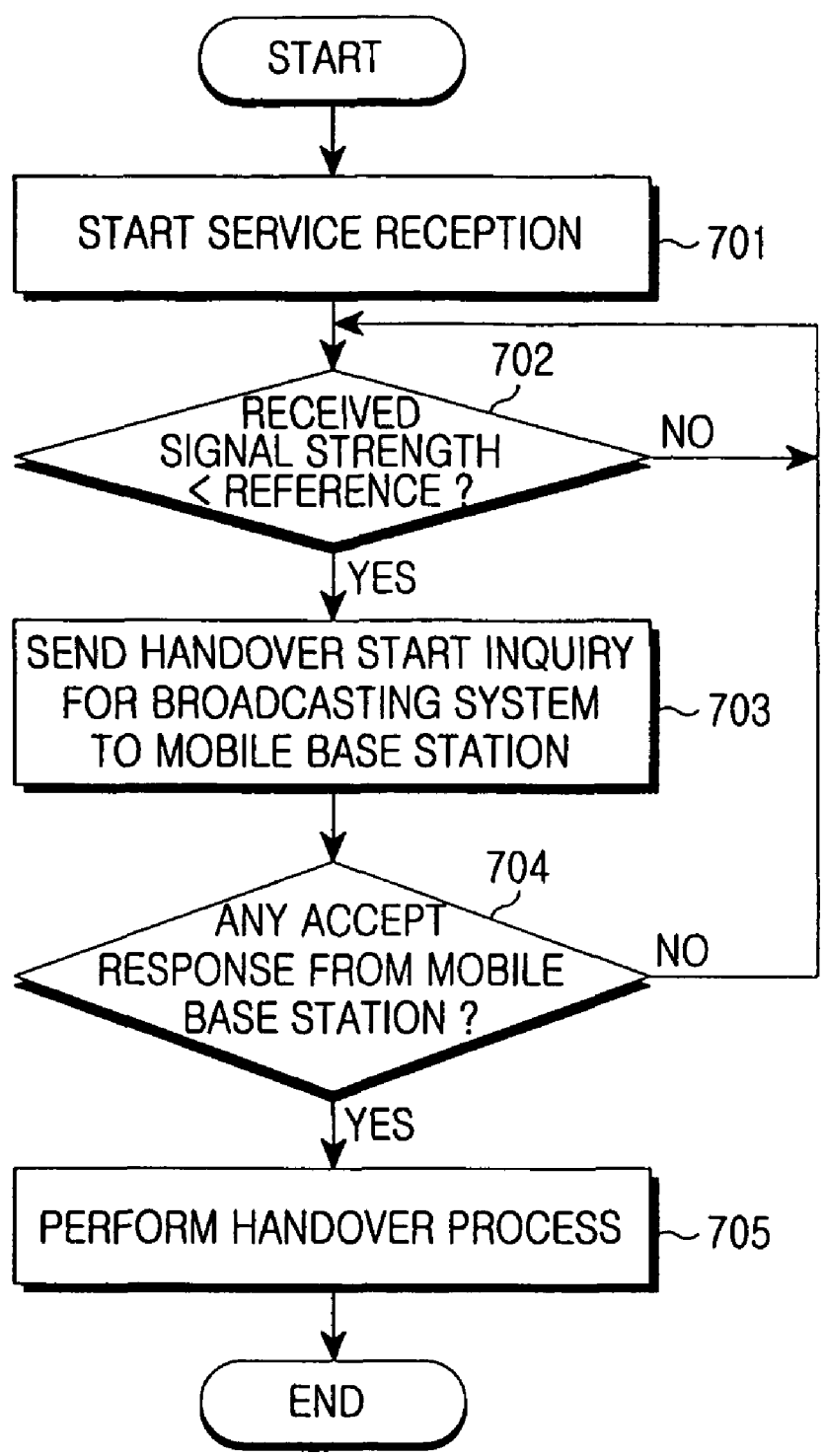
FIG. 7 is a flowchart illustrating a process of performing a handover in a terminal according to the present invention.

FIG. 7 shows a process of performing handover in a terminal according to the present invention. In step 701, a terminal receives a signal from a serving broadcast transmitter and starts a service desired by the user. In step 702, the terminal measures strength of the received signal and compares the measured strength of the received signal with a reference value. If the strength of the received signal is greater than the reference value, the terminal continuously receives the service and returns to step 702 where it periodically measures strength of the received signal. However, if the strength of the received signal is less than the reference value, the terminal proceeds to step 703 where it sends a handover start inquiry signal for the broadcasting system to a mobile communication base station.

After transmitting the handover start inquiry signal to the mobile communication base station, the terminal waits a handover accept response for a predetermined time in step 704. If the terminal fails to receive the handover accept response for the broadcasting system from the mobile communication base station for the predetermined time, it repeats the measurement process for the received signal in step 702, without performing a handover process. However, upon receipt of the handover accept response from the mobile communication base station, the terminal proceeds to step 705 where it performs a handover process from the serving broadcast transmitter to a target broadcast transmitter in step 705.

In the process where the terminal obtains information for performing a handover process of the broadcasting system from the mobile communication base station, the mobile communication base station can transmit the information to the terminal in the following ways. The mobile communication base station can determine whether to start a handover process of the broadcasting system and provides the result to the terminal. The mobile communication base station can also provide even the information on the target broadcast transmitter to which the terminal will be handed over, in addition to the process of determining whether to start a handover process of the broadcasting system and providing the result to the terminal. These processes will be separately described with reference to their associated drawings.

Figure 8:
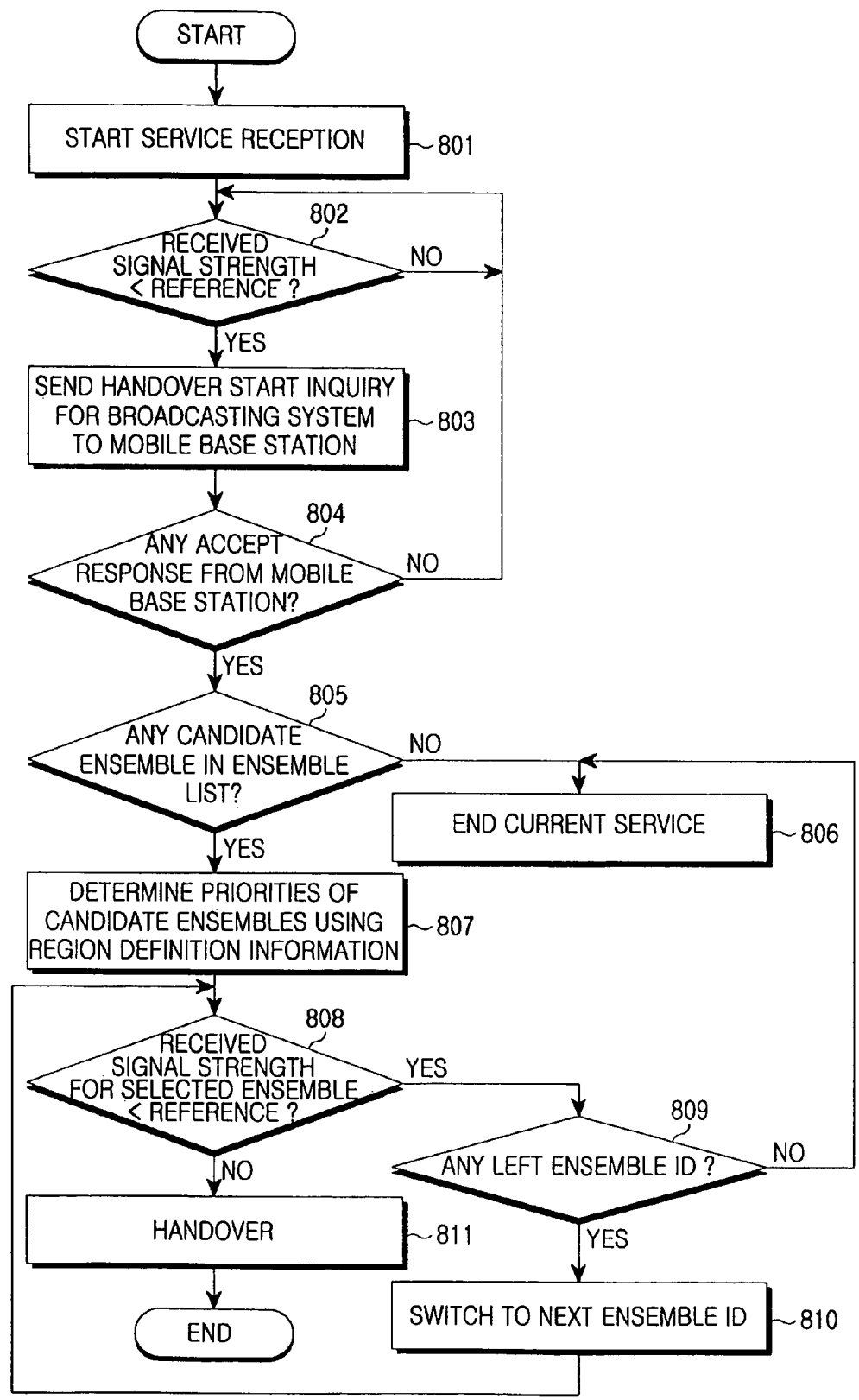
FIG. 8 is a flowchart illustrating a process of performing a handover in a terminal according to the present invention.

FIG. 8 shows one example of a process of performing handover in a terminal according to the present invention. In step 801, a terminal receives a signal from a serving broadcast transmitter and starts a service desired by the user. In step 802, the terminal measures strength of the received signal, and compares the strength of the received signal with a reference value. If the strength of the received signal is greater than the reference value, the terminal periodically measures strength of the received signal while continuously receiving the service. However, if the strength of the received signal is less than the reference value, the terminal proceeds to step 803 where it sends a handover start inquiry for the broadcasting system to a mobile communication base station and then waits for a handover accept response for the broadcasting system from the mobile communication base station.

In step 804, if the terminal fails to receive the handover accept response for the broadcasting system from the mobile communication base station, it returns to step 802 to repeat the measurement process for the received signal without performing the handover process. However, upon receipt of the handover accept response for the broadcasting system from the mobile communication base station, the terminal proceeds to step 805 where it searches for candidate ensembles. The candidate ensembles refer to other ensembles including the same service as the currently selected service in an ensemble list of the receiver. The ensemble list refers to a list of all ensembles based on which a receiver can obtain information on candidate ensembles using an SI received through an FIC received from the broadcast transmitter. If there is no candidate ensemble including the same service as the currently selected service in the ensemble list, handover is impossible. Therefore, the terminal proceeds to step 806 where it ends the current service.

However, if there is any candidate ensemble including the same service as the selected service in the ensemble list, the terminal proceeds to step 807 where it searches for region definition information in the SI information. The region definition information is composed of latitude and longitude information for a Region Identification (RegionID). The RegionID is an ID assigned to the regionally classified ensembles belonging to the same region, and there is a high possibility that the ensembles having the same RegionID will be adjacent to each other. Because it is possible to obtain regional information of RegionID through the region definition information, it is possible to roughly determine positions of the ensembles designated as the candidate ensembles. The terminal determines priorities of the candidate ensembles based on the position determination. The terminal determines the ensembles located nearer to the current ensemble as ensembles having higher priority, and determines the ensembles located farther from the current ensemble as ensembles having lower priority.

In step 808, the terminal first selects the highest-priority ensemble according to priorities of the ensembles, measures strength of a received signal for the selected ensemble, and then compares the strength of the received signal with a reference value. If the strength of the received signal is greater than the reference value, the terminal proceeds to step 811 where it determines a handover to the selected ensemble. However, if the strength of the received signal for the selected ensemble is less than the reference value, the terminal determines in step 809 whether there is any ensemble having the next highest priority. If it is determined in step 809 that there is any left ensemble whose signal strength is to be measured by the receiver, the terminal proceeds to step 810 where it selects a new ensemble by setting an ID of the highest-priority ensemble among the left ensembles, and then returns to step 808. If there is no next-high priority ensemble, the terminal proceeds to step 806 where it ends the current service, because the terminal has received no ensemble signal whose strength is greater than the reference value. If the terminal selects an ensemble from the left ensembles according to priority in step 810, the terminal returns to step 808 where it measures strength of a received signal for the selected ensemble, and then compares again the strength of the received signal with the reference value. If the strength of the received signal is greater than the reference value, the terminal proceeds to step 811 where it determines handover to the selected ensemble. However, if the strength of the received signal for the selected ensemble is less than the reference value, the terminal proceeds to step 809 where it repeats the foregoing process of selecting the left ensemble among the candidate ensembles.

Figure 9:
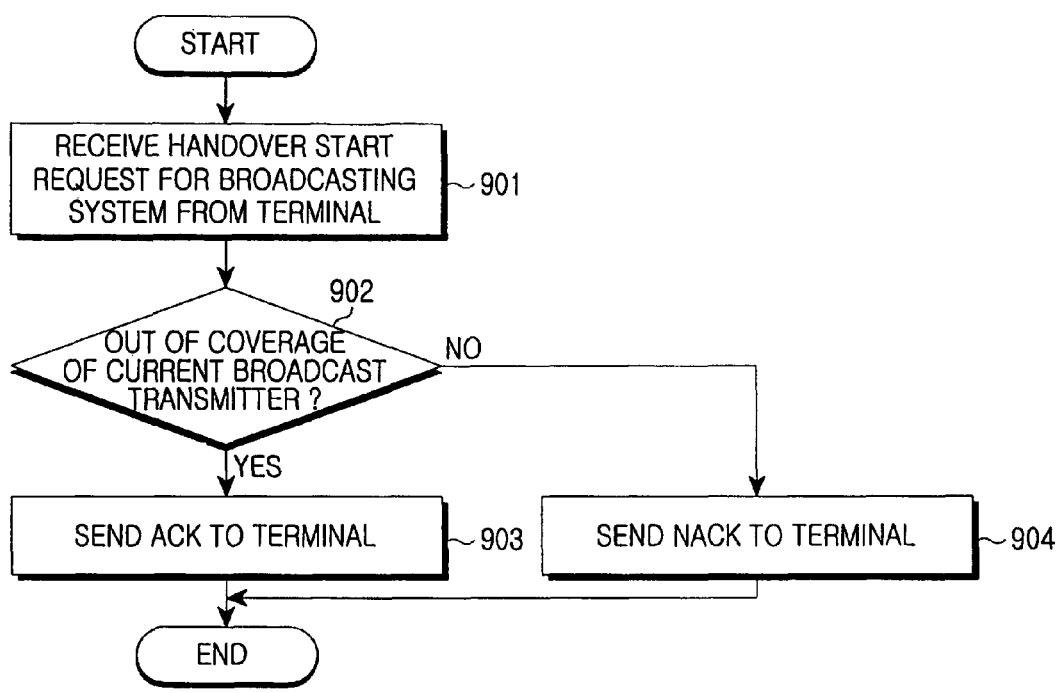
FIG. 9 is a flowchart illustrating a process of performing a handover in a mobile communication base station according to the present invention.

FIG. 9 shows another example of a process of performing handover in a mobile communication base station according to the present invention. In step 901, a mobile communication base station receives a handover start request message for the broadcasting system from a particular terminal in its own cell coverage. In step 902, the mobile communication base station detects a position of the terminal, and determines whether the detected position is out of a service area of a corresponding broadcast transmitter. As a method for detecting a position of the terminal, the mobile communication base station can either detect a position of the terminal by receiving a signal for position detection from the terminal, or can detect a position of the terminal using the external device as shown in FIG. 5. After detecting the position of the terminal, the mobile communication base station, as it already has information on the position of the broadcast transmitter, determines in which position of the service area of the broadcast transmitter the terminal is located.

After detecting the position of the terminal, if it is determined that the terminal is located in the position where the terminal should perform handover of the broadcasting system, the mobile communication base station transmits an Acknowledge (ACK) message for accepting the handover start request for the broadcasting system to the terminal in step 903. If the terminal is not located in the position where it should perform handover of the broadcasting system, the mobile communication base station proceeds to step 904 where it transmits a Not Acknowledge (NACK) message for rejecting the handover start request for the broadcasting system to the terminal. The messages are transmitted/received using the channel used for communication between the mobile communication base station and the terminal, and the transmission scheme and transmission position are determined as the scheme and position available in the mobile communication system.

Figure 10:
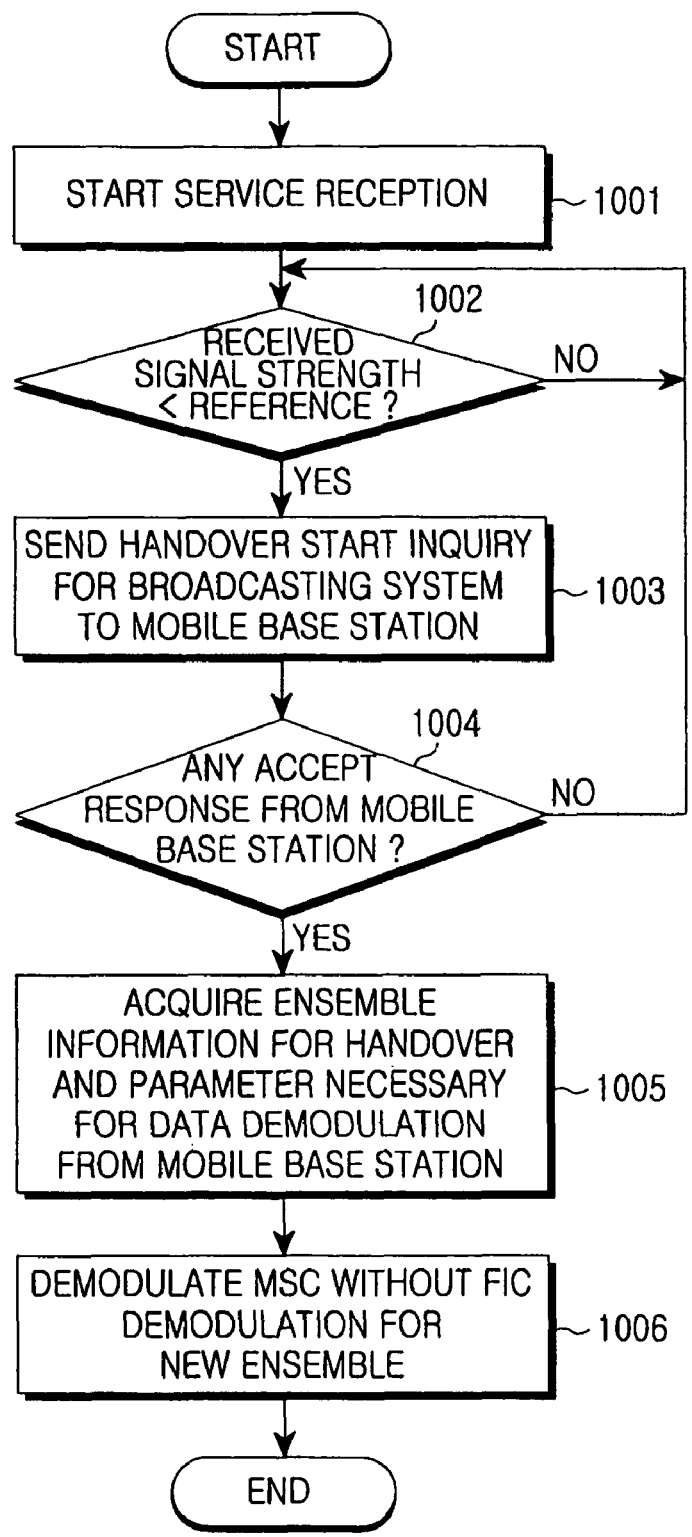
FIG. 10 is a flowchart illustrating a process of performing a handover in a terminal according to the present invention.

FIG. 10 shows another example of a process of performing handover in a terminal according to the present invention. In step 1001, a terminal receives a signal from a serving broadcast transmitter and starts a service desired by the user. In step 1002, the terminal measures strength of the received signal, and compares the strength of the received signal with a reference value. If the strength of the received signal is greater than the reference value, the terminal periodically measures strength of the received signal while continuously receiving the service. However, if the strength of the received signal is less than the reference value, the terminal proceeds to step 1003 where it sends a handover start request for the broadcasting system to a mobile communication base station.

After transmitting the handover start request signal to the mobile communication base station, the terminal waits for a handover accept response for the broadcasting system from the mobile communication base station in step 1004. Upon failure to receive the handover accept response for the broadcasting system from the mobile communication base station, the terminal returns to step 1002 where it repeats again the measurement process for the received signal, without performing a handover process. However, upon receipt of the handover accept response for the broadcasting system from the mobile communication base station, the terminal proceeds to step 1005 where it starts the handover process and obtains information for performing a handover of the broadcasting system from the mobile communication base station.

The information for performing handover of the broadcasting system includes not only the information on the target ensemble, which is information obtained through control information, but also a parameter for data demodulation. The parameter for data demodulation means MCI for demodulating MSC data in the broadcasting system, and the MCI is information on an ensemble of the target broadcast transmitter, rather than an ensemble of the current serving broadcast transmitter. That is, when a particular terminal moves from a service area of a current (or serving) broadcast transmitter to a service area of a new (or target) broadcast transmitter, the mobile communication base station previously transmits control information for the ensemble of the new broadcast transmitter to the terminal. Due to the previously transmitted control information for the target ensemble, the terminal can demodulate service data by immediately demodulating MSC without demodulating FIC in step 1006, when it moves to the service area of the new broadcast transmitter.

Figure 11:
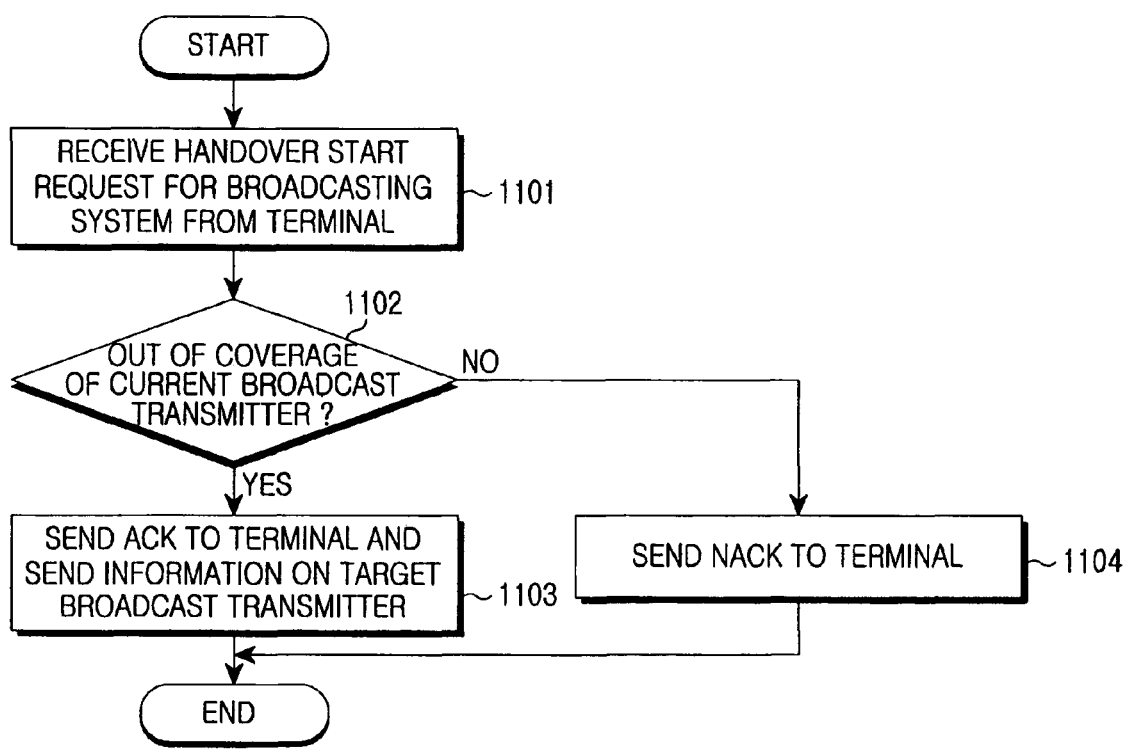
FIG. 11 is a flowchart illustrating a process of performing a handover in a mobile communication base station according to the present invention.

FIG. 11 shows another example of a process of performing a handover in a mobile communication base station according to the present invention. In step 1101, a mobile communication base station receives a handover start request message for the broadcasting system from a particular terminal in its own cell coverage. Upon receipt of the handover start request for the broadcasting system from the particular terminal, the mobile communication base station detects a position of the terminal, and determines in step 1102 whether the detected position of the terminal is out of a service area of the broadcast transmitter. As a method for detecting a position of the terminal, the mobile communication base station can detect a position of the terminal by receiving a signal for position detection from the terminal, or detect a position of the terminal using the external device as shown in FIG. 5. After detecting the position of the terminal, the mobile communication base station, as it already has information on the position of the broadcast transmitter, determines in which position of the service area of the broadcast transmitter the terminal is located.

After detecting the position of the terminal, if it is determined that the terminal is located in the position where the terminal should perform handover of the broadcasting system, the mobile communication base station transmits an ACK message for accepting the handover start request for the broadcasting system, and information on the target broadcast transmitter, to the terminal in step 1103. The positional information for the target broadcast transmitter is received at the mobile communication base station from the broadcasting system, and the positional information is updated each time the position of the broadcast transmitter is changed. If the terminal is not located in the position where it should perform handover of the broadcasting system, the mobile communication base station proceeds to step 1104 where it transmits a NACK message for rejecting the handover start request for the broadcasting system to the terminal. The messages are transmitted/received using the interaction channel used for communication between the mobile communication base station and the terminal, and the transmission scheme and transmission position are determined as the scheme and position available in the mobile communication system.

The above-described handover process according to the present invention can also be applied to another digital broadcasting system and another network system. However, the DAB system and the mobile communication system have a standard for defining the interface for bidirectional service. Therefore, if there is an intention to apply the handover process to another digital broadcasting system and another network system, a standard for defining the interface with another network system is considered in a standard of the digital broadcasting system, and if the interface is not supported, a standard for defining the interface with the two systems should be considered.

As can be understood from the foregoing description, the present invention obtains information on an expected handover time and information on a target broadcasting system for handover from a mobile communication base station in performing handover to support seamless service in a digital broadcasting system, thereby reducing a handover error and a handover process time.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for performing handover by a terminal in a digital broadcasting system, the method comprising the steps of:
   measuring strength of a received signal from a serving broadcast transmitter of the digital broadcasting system while receiving a broadcast service from the serving broadcast transmitter, and comparing the measured strength of the received signal with a predetermined reference value;
   periodically measuring strength of the received signal while continuously receiving the broadcast service from the serving broadcast transmitter, when the measured strength of the received signal is greater than the reference value;
   sending a handover start request message for the broadcasting system to a base station of a mobile communication system when the measured strength of the received signal is less than or equal to the reference value; and
   performing a handover from the serving broadcast transmitter to a target broadcast transmitter of the digital broadcasting system, upon receipt of an accept message for the handover start request for the broadcasting system from the base station.

2. The method of claim 1, wherein the step of performing handover comprises:
   detecting information on an ensemble of the target broadcast transmitter from the accept message received from the base station; and
   moving to a service area of the target broadcast transmitter using the detected information on the ensemble.

3. The method of claim 2, further comprising acquiring service data of the broadcast service by demodulating a main service channel (MSC) without demodulating a fast information channel (FIC) from the target broadcast transmitter after moving to the service area of the target broadcast transmitter.

4. The method of claim 1, wherein the step of performing a handover comprises:
   searching for candidate ensembles including the currently received broadcast service;
   determining priorities of the candidate ensembles using region definition information indicating positions of ensembles in service information (SI) received through FIC from the serving broadcast transmitter if the candidate ensembles exist;
   selecting the highest-priority ensemble, and comparing strength of a received signal for the selected ensemble with the reference value;
   performing a handover to a target broadcast transmitter having the selected ensemble when the strength of the received signal for the selected ensemble is greater than the reference value; and
   measuring strength of a received signal for the next-highest priority ensemble, and determining whether to perform a handover when the strength of the received signal for the selected ensemble is less than or equal to the reference value.

5. The method of claim 4, wherein the step of determining priorities assigns higher priorities in order of an ensemble located nearer to the serving broadcast transmitter.

6. A method for supporting a handover of a terminal by a base station of a mobile communication system in a digital broadcasting system, the method comprising the steps of:
   receiving a request message for requesting a handover of the broadcasting system from the terminal that is receiving a broadcast service from a serving broadcast transmitter of the digital broadcasting system in its own cell coverage;
   detecting a position of the terminal in response to the request message, and determining whether the terminal is located in a position where it should perform a handover of the broadcasting system, using a predetermined broadcast transmitters' position map;
   transmitting an accept message for accepting the handover request to the terminal when it is determined that the terminal is located in the position where it should perform handover of the broadcasting system; and
   transmitting a reject message for rejecting the handover request to the terminal when it is determined that the terminal is not located in the position where it should perform handover of the broadcasting system.

7. The method of claim 6, further comprising transmitting information on an ensemble of a target broadcast transmitter of the digital broadcasting system to the terminal along with the accept message when it is determined that the terminal is located in the position where it should perform handover of the broadcasting system.

8. The method of claim 7, further comprising transmitting a parameter for data demodulation along with the accept message.

9. The method of claim 8, wherein the parameter for data demodulation includes multiplex configuration information (MCI) for demodulating main service channel (MSC) data of a target broadcast transmitter in the broadcasting system.

10. The method of claim 6, wherein a position of the terminal is detected using information on a time at which the terminal receives signals of other adjacent base stations, or using a global positioning system (GPS) device included in the terminal.

11. The method of claim 6, wherein the determining step determines whether the position of the terminal is out of a service area of the serving broadcast transmitter.

12. An apparatus for performing handover by a terminal in a digital broadcasting system, the apparatus comprising:
   a signal strength measurer for receiving a broadcast service signal from a serving broadcast transmitter of the digital broadcasting system, and measuring strength of the received signal; and
   a controller configured to carry out steps comprising;
   comparing the measured strength of the received signal with a predetermined reference value;
   transmitting a request message for requesting handover of the broadcasting system to a base station of a mobile communication system, to which the terminal belongs when the strength of the received signal is less than the reference value; and
   performing a handover from the serving broadcast transmitter of the digital broadcasting system to a target broadcast transmitter of the digital broadcasting system, upon receipt of an accept response for the handover request for the broadcasting system from the base station.

13. The apparatus of claim 12, wherein the controller receives information on an ensemble of the target broadcast transmitter from the base station, and moves to a service area of the target broadcast transmitter using the information on the ensemble.

14. The apparatus of claim 13, wherein after moving to the service area of the target broadcast transmitter, the terminal acquires service data of the broadcast service by demodulating a main service channel (MSC) without demodulating a fast information channel (FIC) from the target broadcast transmitter.

15. The apparatus of claim 12, wherein the controller is configured to carry out steps comprising:
searching for candidate ensembles including the currently received broadcast service, and determining priorities of the candidate ensembles using region definition information indicating positions of ensembles in service information (SI) received through FIC from the serving broadcast transmitter if the candidate ensembles exist;
selecting a highest-priority ensemble, comparing strength of a received signal for the selected ensemble, measured by the signal strength measurer, with the reference value, and performing a handover to a target broadcast transmitter having the selected ensemble when the strength of the received signal for the selected ensemble is greater than the reference value; and
measuring strength of a received signal for the next-highest priority ensemble, and determining whether to perform handover when the strength of the received signal for the selected ensemble is not greater than the reference value.

16. The apparatus of claim 15, wherein the priorities are assigned so higher priorities are assigned in order of an ensemble located nearer to the serving broadcast transmitter.

17. The apparatus of claim 12, further comprising:
a control data processor for demodulating the broadcast signal data, dividing the demodulated data into main service channel (MSC) data and fast information channel (FIC) data, and detecting multiplex configuration information (MCI) and service information (SI) using the FIC data;
a data processor for decoding the MCS data for each individual service using the MCI and the SI provided from the control information processor; and
an application module for receiving the decoded data and outputting the data in the form for a screen of the terminal.

18. An apparatus for supporting handover of a terminal by a base station of a mobile communication system in a digital broadcasting system, the apparatus comprising:
a transceiver for receiving a request message for requesting handover of the broadcasting system from the terminal in a cell coverage, and transmitting a response message for accepting the handover request to the terminal;
a memory for storing a broadcast transmitters' position map in which positions of adjacent broadcast transmitters are listed; and
a controller configured to carry out steps comprising:
detecting a position of the terminal in response to the request message, determining whether the terminal is located in a position where it should perform handover of the broadcasting system, using the predetermined broadcast transmitters' position map;
transmitting an accept message for accepting the handover request to the terminal via the transceiver when it is determined that the terminal is located in the position where it should perform handover of the broadcasting system; and
transmitting a reject message for rejecting the handover request to the terminal via the transceiver when it is determined that the terminal is not located in the position where it should perform handover of the broadcasting system.

19. The apparatus of claim 18, wherein the controller transmits information on an ensemble of a target broadcast transmitter to the terminal along with the accept message when it is determined that the terminal is located in the position where it should perform handover of the broadcasting system.

20. The apparatus of claim 19, wherein the transmitter further transmits a parameter for data demodulation along with the accept message.

21. The apparatus of claim 18, wherein a position of the terminal is detected using information on a time at which the terminal receives signals of other adjacent base stations, or using a global positioning system (GPS) device included in the terminal.

22. The apparatus of claim 18, wherein controller determines whether the position of the terminal is out of a service area of the serving broadcast transmitter, to determine whether to perform a handover.

* * * * *